United States Patent Office 3,341,463
Patented Sept. 12, 1967

3,341,463
ORGANIC POLYISOCYANATES
Paul G. Gemeinhardt, Pittsburgh, Pa., assignor to Mobay Chemical Company, Pittsburgh, Pa., a corporation of Delaware
No Drawing. Filed Nov. 16, 1964, Ser. No. 411,608
9 Claims. (Cl. 252—182)

This invention relates to organic polyisocyanates and more particularly to an improved mixture of polyisocyanates containing additives adapted to make the production of polyurethane plastics from the organic polyisocyanate more straightforward and more particularly to organic polyisocyanates which are adapted to produce cellular polyurethanes having improved physical properties.

It is known to use chemically pure isocyanates such as monomeric toluylene diisocyanate, as well as mixtures of homologous organic isocyanates such as polyphenyl methylene polyisocyanates in conjunction with active hydrogen containing compounds to prepare polyurethane plastics. The chemically pure isocyanates such as monomeric toluylene diisocyanate when used alone without the addition of any additive to impart flame resistance to the product produce a cellular polyurethane which will burn and support combustion once ignited, thus making it unsatisfactory for the production of building materials and the like. The use of the homologous mixtures of the organic polyisocyanate such as the polyphenyl methylene isocyanate series which results from the phosgenation of the condensation product of aniline with formaldehyde improve the dimensional stability and flame resistance of polyurethane plastics based thereon, but several other difficulties are experienced. There is a tendency when using the polyphenyl methylene isocyanate series of isocyanates for the production of rigid cellular polyurethanes for the cells near the edge and toward the top of particularly a thin cross section molding to become elongated and thus weak and of a low insulation value. Since neither the toluylene diisocyanate alone nor the polyphenyl methylene isocyanate series alone would solve the problem a mixture of the two has been tried. This resulted in substantial improvement when certain amounts of the toluylene diisocyanate were mixed with certain amounts of the polyphenylene methylene isocyanate homologues. Thus, the elongated cells along the wall of the thin section molding were almost completely eliminated but two difficulties persisted. The major cause of concern among the producers of thin cross section, high rise moldings was the area at the top of the mold where the cells became weakened due to irregular structure and at low temperatures of —10° F. or lower would shrink away from the walls thus decreasing the insulating value of the panel near the top. Another difficulty was that the panels were discolored at the center indicating that the mixture of isocyanates gel too fast in order to produce a satisfactory foam. The fast gelation may explain the spongy character of the foam at the top of the rise which results in low temperature shrinkage.

It is therefore an object of this invention to provide an improved organic polyisocyanate composition and improved polyurethane plastics prepared therefrom. A further object of this invention is to provide a mixture of organic polyisocyanates and polyurethane plastics prepared therefrom containing critical proportions of additives which avoid the foregoing difficulties. Still another object of this invention is to provide a mixture of organic polyisocyanates which are adapted to the preparation of improved moldable polyurethane plastics. A further object of this invention is to provide a mixture of polyisocyanates adapted to produce a cellular polyurethane plastic, the mixture being such that there is a favorable balance between the rate of foam rise, the rate of gelation and the exotherm of the reaction mixture so that very little shear forces result to cause an elongated cell and shrinkage near the top of the rise and so that very little discoloration results in the core of the cellular polyurethane article or molding to be prepared.

The foregoing objects and others which will become apparent from the following description are accomplished in accordance with this invention, generally speaking, by providing a mixture of from about 32 to 48% by weight of 2,4-toluylene diisocyanate, about 8 to 12% by weight of 2,6-toluylene diisocyanate, about 18 to 27% by weight of diphenyl methane diisocyanate, about 12 to 18% by weight of

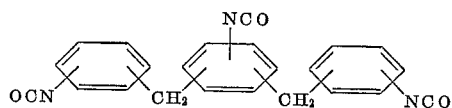

about 10 to 15% by weight of

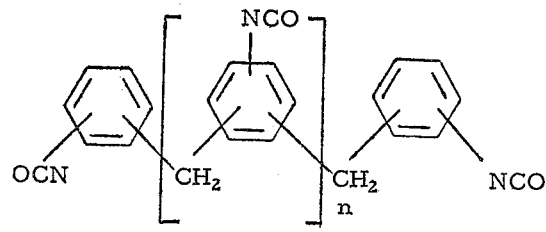

wherein $n$ is 2 to 5,
said mixtures of organic polyisocyanates containing from about 0.2 to 5% by weight of an acid phosphate and from about 0.01 to 2% by weight of hydrolyzable chloride with the proviso that there is a total of at least 0.75% by weight of acid phosphate and hydrolyzable chloride in the mixture of isocyanates. Thus, it has been found in accordance with the present invention that the foregoing combination of particular isocyanates, acid phosphate and preferably an alkyl acid phosphate in the amounts set forth above together with the amount of hydrolyzable chloride set forth above will react with an active hydrogen compound producing a cellular polyurethane plastic which has all of the desired characteristics of resistance to shrinkage at low temperatures and which avoids discoloration of the core of the polyurethane in the course of the preparation of the cellular polyurethane.

Where the mixture of isocyanates of this invention is to be used to prepare a polyurethane foam from polyols containing 5% by weight or more of a polyol containing tertiary nitrogen, the amount of acid phosphate should be in the range of 0.2 to 2% by weight and the amount of hydrolyzable chloride should be in the range of 0.01 to 1% by weight and less than one equivalent per equivalent of tertiary nitrogen in order to avoid undesirable side effects including discoloration, fissures, shrinkage, etc.

In accordance with a preferred embodiment of the invention, the organic polyisocyanates set forth above are combined in the proportions set forth above with from 0.2 to 5% by weight of an alkyl acid phosphate and from 0.01 to 2% by weight of hydrolyzable chloride and then the combination of isocyanates is heated at a temperature of from about 25° C. to 75° C. for from about 5 minutes to about 2 hours to cause the alkyl acid phosphate to react with the organic polyisocyanate and produce a storage stable product particularly adapted to the preparation of improved cellular polyurethane plastics. This product is adapted for production as an article of commerce which avoids the difficulties of the prior art. It is not known exactly what product is formed when the alkyl acid phosphate reacts with the mixture of isocyanates. It is believed that the product may result from reaction of the —NCO groups with the —OH groups of the acid phosphate. It is possible, however, that the acid phosphate may react with the hydrolyzable chloride or in other words carbamyl chlorides which are present in order to form a compound. Where it is desirable to prepare the mixture of isocyanates together with the alkyl acid phosphate and the hydrolyzable chlorides at one location and use the mixture to prepare a polyurethane at another location it is desirable to carry out the reaction as set forth above. However, it is not necessary to pre-react the alkyl acid phosphate with the mixture of organic polyisocyanates and hydrolyzable chloride in order to obtain satisfactory results in the preparation of cellular polyurethane plastics. Therefore, the invention contemplates both the unreacted combination annd the reaction product. It is an essential feature of the invention however, that no more than 5% by weight of the total weight of the isocyanate be the alkyl or aryl acid phosphate. Greater amounts of the alkyl or aryl acid phosphate in the isocyanate will interfere with the reaction of the isocyanate with the active hydrogen containing compound and upset the balance between the rate of gelatin of the polymer and the rate of foam rise so that the advantages obtained by using the additives are lost. If amounts greater than 5% by weight of acid phosphate are used in the isocyanates, then splits and fissures result at the center of the foam block. Less than 0.2% by weight of the acid phosphate is insufficient to avoid the low temperature shrinkage and discoloration particularly when the foam is subjected to temperatures of —10° F. and below.

Both the amount of the acid phosphate and the amount of hydrolyable chloride is important however. This is particularly true for the preparation of storage stable mixtures of isocyanate which have satisfactory characteristics for mixing with an active hydrogen containing compound to prepare a polyurethane plastic. It is not possible to avoid all of the shrinkage problem by merely using increasing amounts of hydrolyzable chloride. More than 2% of hydrolyzable chloride would be required in order to improve the resistance of cellular polyurethanes to low temperature shrinkage. However, more than 2% of hydrolyzable chloride cannot be tolerated in the isocyanate because on even relatively short storage it causes an increase in viscosity of the mixture of isocyanates rendering them unsatisfactory for mixing with an active hydrogen containing compound.

A particularly preferred mixture of isocyanate is one which is made up of 32 to 48% by weight of 2,4-toluylene diisocyanate, 8 to 12% by weight of 2,6-toluylene diisocyanate, 18 to 27% by weight of 4,4'-diphenyl methane diisocyanate, 12 to 18% by weight of

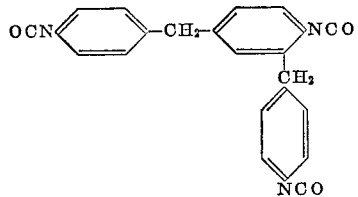

and 10 to 15% by weight of

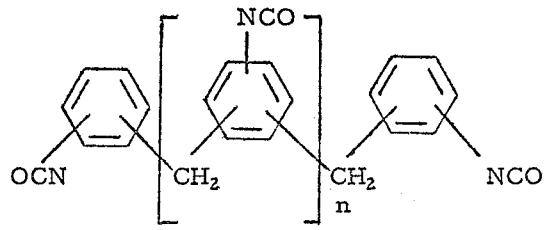

wherein $n$ is 2 to 5, with from about 0.2 to about 5% by weight of an alkyl acid phosphate and from about 0.01 to about 2% by weight of hydrolyzable chloride. It is preferred to use a mixture of di-n-butyl acid phosphate and mono-n-butyl acid phosphate preferably about 60% of the di-n-butyl acid phosphate and about 40% of the mono-n-butyl acid phosphate. There must be at least 0.75% by weight of the combined hydrolyzable chloride and acid phosphate.

Any suitable acid ester of phosphoric acid may be used such as, for example, monoamyl acid phosphate, mono-n-butyl acid phosphate, monoethyl butyl acid phosphate, monoisopropyl acid phosphate, monomethyl acid phosphate, monophenyl acid phosphate, mono-n-propyl acid phosphate, mono-n-octyl acid phosphate, diamyl acid phosphate, di-n-butyl acid phosphate, diethyl butyl acid phosphate, diisopropyl acid phosphate, dimethyl acid phosphate, diphenyl acid phosphate and the like. A particularly preferred acid phosphate is the commercial mixture which contains about 40% mono-n-butyl acid phosphate and about 60% di-n-butyl acid phosphate.

The hydrolyzable chloride in the isocyanate may be adjusted by adding hydrochloric acid to the isocyanate or an acid chloride such as benzoyl chloride, phthaloyl chloride, adipoyl chloride, $PCl_3$ and the like may be added.

In accordance with still another preferred embodiment of the invention, the heavy metal content of the isocyanate and particularly the iron content of the isocyanate is adjusted to a level below 200 parts/million. It is particularly preferred that the isocyanate have less than 200 parts/million of iron since iron has an effect on the flame resistance of the product.

Where polyurethane plastics are prepared, one may use any suitable organic compound containing active hydrogen containing groups as determined by the Zerewitinoff method. The isocyanates of the invention are particularly adapted to the preparation of rigid cellular polyurethane plastics based on polyols having from 3 to 8 free hydroxyl groups which preferably have a molecular weight of from about 100 to 1000. Any suitable active hydrogen containing compound may be used including, for example, polyester, polyethers, polyester amides, polythioethers and the like. Any suitable polyester may be used such as, for example, those obtained by reacting an excess of a polyhydric alcohol with a polycarboxylic acid. Any suitable polycarboxylic acid may be used such as, for example, oxalic acid, malonic acid, succinic acid, glutaric acid, alpha,beta-diethylsuccinic acid, isophthalic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta - diethylsuccinic acid, isophthalic acid, terephthalic acid, hemimellitic acid, trimellitic acid, trimesic acid, mellophanic acid, prehnitic acid, pyromellitic acid, benezenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

Any suitable polyether may be used such as, for example, those obtained by reacting one of the alkylene oxide set forth above with a polyol such as, for example, ethylene glycol, propylene glycol, trimethylolpropane, glycerine, pentaerythritol, sorbitol, 1,2,6-hexane triol, alpha-methyl-d-glucoside and the like. One may also react alkylene oxides with water in order to obtain the polyether polyols. Any suitable polythioether polyol may be used, for example, those prepared by the condensation of thiodiglycol or by reacting an alkylene oxide with thiodiglycol as more particularly set forth above.

In addition, one may use reaction products of phosphoric acid with a polyhydric alcohol or phosphorous-containing polyols which are prepared by reacting a half ester of an unsaturated carboxylic acid and a polyhydric alcohol with a trialkyl phosphite. It is preferred that phosphorous containing polyols also contain nitrogen and suitable phosphorous containing polyols which also contain nitrogen having the formula:

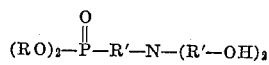

where R and R' have the meanings given above may be used. A preferred compound is dioxyethyl-N,N-bis(2-hydroxyethyl) amino methyl phosphonate,

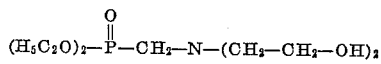

The preferred hydroxyl number for the resin mixture is from about 300 to 600, most preferably 350 to 450 to yield best flame resistance and physical properties including dimensional stability.

In accordance with still another preferred embodiment of this invention, it is possible to chemically combine the phosphorous containing compound with the above mentioned active hydrogen containing compounds which do not contain phosphorous so that a composite product results which is made up on a weight basis of from about 20 to about 90 and preferably 30 to 60 parts of the phosphorous containing basic structure, the balance being a skeleton of organic compound containing active hydrogen containing groups. Thus, for example, one may take a polyhydric polyalkylene ether, polyester, polythioether, polyamine or the like and react it with one of the phosphorous containing compounds set forth above to prepare a composite type of product. To illustrate a specific example, one may modify pentaerythritol with both propylene oxide and di-oxyethyl-N,N-bis-(2-hydroxy ethyl amino methyl) phosphonate to prepare a product having an hydroxyl number of from about 200 to about 600 and containing from about 20 to about 90 parts by weight of the phosphonate and the balance pentaerythritol and propylene oxide adduct thereof. It is preferred that these composite phosphorous containing polyols have from 3 to 8 free hydroxyl groups.

When preparing a cellular polyurethane plastic in accordance with the invention, one should provide a blowing agent which causes the reaction mixture to expand by the generation of gas during the isocyanate-polyaddition reaction. The blowing agent may be water which reacts with isocyanate to produce a carbon dioxide which blows the reaction mixture. Alternately, a temperature sensitive blowing agent may be used such as, for example, a halohydrocarbon including trichlorofluoromethane, dichlorofluoromethane, trichlorotrifluoromethane, dichlorodifluoromethane and the like or an alkane such as butane, hexane, heptane, or the like, methylene chloride or any other suitable blowing agent.

It is sometimes desirable to carry out the reaction for the preparation of a cellular polyurethane plastic in the presence of a catalyst. As pointed out above, one should avoid iron compounds where flame resistance is desired. When the polyols used for the reaction contain a tertiary nitrogen atom, it is often not necessary to have any added catalyst. It may be desirable to add a catalyst which may be either a tertiary amine or a tin salt of a carboxylic acid. Suitable catalysts of the tertiary amine type include triethylene diamine, tetramethyl quanidine, N,N-diethyl-3-diethyl-propyl amine, N-methyl morpholine, N-ethyl morpholine, diethyl ethanol amine, N-coco morpholine, 1-methyl-4-dimethyl aminoethyl piperazine, 3-methoxy-N-dimethyl propyl amine, N-dimethyl-N'-methyl isopropyl propylene diamine, dimethyl benzyl amine, permethylated triamine and the like. Suitable tin salts are stannous octoate, stannous oleate, dibutyl-tin-di-2-ethyl hexoate and the like.

It is very desirable to have a foam stabilizer present in the cource of the reaction and here one may use any suitable foam stabilizer including polydimethyl siloxane and preferably one having a viscosity between about 20 and about 200 centipoises at 25° C. or an alkyl silane polysiloxane polyoxyalkylene block copolymer such as, those disclosed in U. S. Patent 2,834,748. A preferred alkyl silane polysiloxane polyoxyalkylene block copolymer is within the scope of the formula:

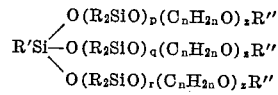

wherein R, R' and R'' are alkyl radicals having 1 to 4 carbon atoms, $p$, $q$, and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34.

One may also use sulphonated castor oil as the foam stabilizer substance.

Therefore, the isocyanates of this invention are useful for the production of rigid cellular polyurethane plastics which may be used for the production of improved insulation particularly in the panels of refrigerator trucks, railroad cars and the like.

The invention is further illustrated by the following examples in which parts are by weight unless otherwise specified.

*Example 1*

About 40% by weight of 2,4-toluylene diisocyanate, about 10% by weight of 2,6-toluylene diisocyanate, about 22.5% by weight of 4,4'-diphenyl methane diisocyanate, about 15% by weight of

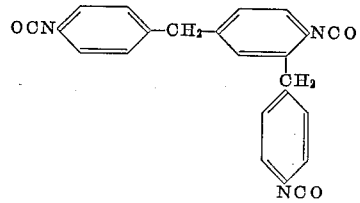

and about 12.5% by weight of homologues having the formula

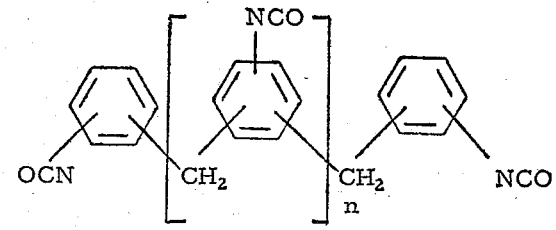

which are prepared by the phosgenation of the condensation product of aniline with formaldehyde where $n$ has an average value of about 2.5, containing about 0.1% by weight of hydrolyzable chlorides and about 2% by weight of a mixture of 60% by weight di-n-butyl acid phosphate and 40% by weight of mono-n-butyl acid phosphate are combined by stirring together in a suitable apparatus.

The foregoing mixture is used immediately after combination to prepare a cellular polyurethane plastic. Two components are mixed on a machine mixer as disclosed in U.S. Reissue Patent 24,514. The isocyanate mixture prepared above is Component I (about 87 parts). Component II is prepared by mixing about 100 parts of the reaction product of alpha-methyl-D-glucoside with propylene oxide which has as hydroxyl number of about 460, about 1 part of N,N,N',N'-tetramethyl butane diamine, about 1 part of N,N-dimethyl amino ethanol and about 1 part of the silicone oil having the formula

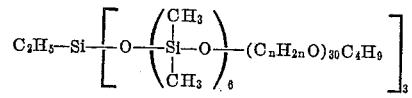

wherein ($C_nH_{2n}O$) is a mixed polyoxyethylene and oxypropylene block copolymer containing about 17 oxyethylene units and about 13 oxypropylene units, and about 25 parts of trichlorofluoromethane. The reaction mixture is discharged into a mold measuring 2′ x 4″ x 4′. The maximum temperature at the center of the panel is about 110° C. and the foam rises to the top of the 4 foot high mold in about 230 seconds. When this panel is subjected to temperatures of −10, −40 and −70° F. for over one week substantially no shrinkage results. Moreover, there is substantially no discoloration at the center of the foam in the panel.

*Example 2*

Example 1 is repeated except that Component I is heated to about 75° C. for about 1 hour and then stored for about 1 week prior to use. There was substantially no change in the viscosity of the reaction mixture from the time of mixing and heating to the end of the first week. A polyurethane foam prepared from the pre-reacted isocyanate is substantially identical to that produced in Example 1.

*Example 3*

When the foregoing Examples 1 and 2 are repeated except that the mixture of butyl acid phosphate is omitted, the foams discolor particularly at the center of the panel and they exhibit severe shrinkage particularly near the top of the 4 foot panel when subjected to a low temperature of even only −10° F. for one week.

*Example 4*

Example 1 is repeated except 0.3 part of HCl per 100 parts of the mixture of isocyanate is added to bring the total amount of hydrolyzable chloride in the mixture of isocyanates up to about 0.4% by weight. Also a total of about 0.5% by weight of the mixture of butyl acid phosphate is used.

The foregoing mixture of isocyanates is used immediately after its combination to prepare a cellular polyurethane plastic. The components are mixed on a machine mixer as disclosed in U.S. Reissue Patent 24,514. The isocyanate mixture prepared above is Component I. Component II is prepared by mixing about 100 parts of the propylene oxide adduct of glucoside having an hydroxyl number of about 450 with about 0.6 part of N,N-dimethyl amino ethanol, about 2.0 parts of the silicone oil of Example 1 and about 25 parts of trichlorofluoromethane. About 87 parts of Component I is used. The reaction mixture is discharged into a mold and the foam rises to the top of a 4 foot high mold in about 225 seconds. When this panel is subjected to temperatures of about −10, −40 and −70° F. for over 1 week substantially no shrinkage results. Moreover, there is substantially no discoloration at the center of the foam in the panel.

It is to be understood that the foregoing examples are given for the purpose of illustration and that any other suitable mixture of isocyanates, polyols, hydrolyzable chloride additives, acid phosphates or the like could have been used therein provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. An organic polyisocyanate composition comprising from about 32 to 48% by weight of 2,4-toluylene diisocyanate, about 8 to 12% by weight of 2,6-toluylene diisocyanate, from about 18 to 27% by weight of diphenyl methane diisocyanate, from about 12 to 18% by weight of

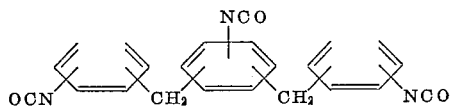

from about 10 to 15% by weight of

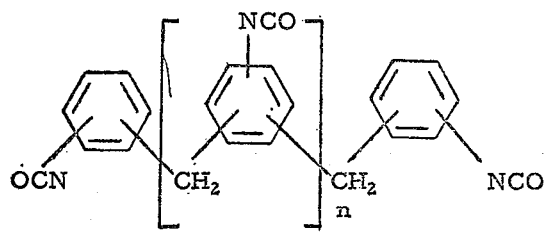

wherein $n$ is 2 to 5, from about 0.01 to about 2% by weight of hydrolyzable chloride, from about 0.2 to about 5% by weight of an acid phosphate with the proviso that at least about 0.75% by weight of the mixture is hydrolyzable chloride and acid phosphate combined.

2. The composition of claim 1 wherein said acid phosphate is an alkyl acid phosphate.
3. The composition of claim 1 wherein said acid phosphate is an aryl acid phosphate.
4. The composition of claim 1 wherein said acid phosphate is a mixture of lower alkyl acid phosphates.
5. The composition of claim 1 wherein said acid phosphate is a mixture of mono-n-butyl acid phosphate and di-n-butyl acid phosphate.
6. An organic polyisocyanate composition which comprises from about 32 to 48% by weight of 2,4-toluylene diisocyanate, from about 8 to 12% by weight of 2,6-toluylene diisocyanate, from about 18 to 27% by weight of 4,4′-diphenyl methane diisocyanate, from about 12 to 18% by weight of

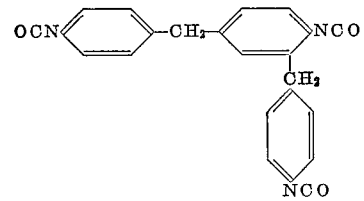

from about 10 to 15% by weight of

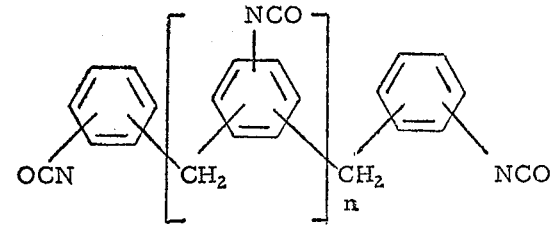

wherein $n$ has an average value of about 2.5, from about 0.01% to about 2% by weight of hydrolyzable chloride and from about 0.2% to about 5% by weight of an alkyl acid phosphate with the proviso that at least about 0.75% by weight of the mixture is hydrolyzable chloride and alkyl acid phosphate combined.

7. The composition of claim 6 wherein said alkyl acid phosphate is a mixture of mono-n-butyl acid phosphate and di-n-butyl acid phosphate.

8. An organic polyisocyanate composition which comprises about 40% by weight of 2,4-toluylene diisocyanate, about 10% by weight of 2,6-toluylene diisocyanate, about 22.5% by weight of 4,4'-diphenyl methane diisocyanate, about 15% by weight of

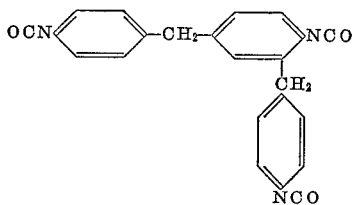

about 12.5% by weight of

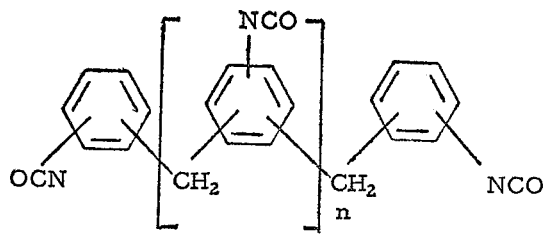

wherein $n$ has an average value of about 2.5, about 0.1 to 2% hydrolyzable chloride and about 0.2 to 5% by weight of a mixture of 40% mono-n-butyl acid phosphate and about 60% di-n-butyl acid phosphate.

9. The organic polyisocyanate composition of claim 1 wherein the amount of hydrolyzable chloride is within the range of from about 0.01% to about 1% by weight and the amount of acid phosphate is within the range of from about 0.2% to about 2% by weight.

References Cited

UNITED STATES PATENTS 3,013,048  12/1961  Holtschmidt _____ 260—77.5 X

FOREIGN PATENTS 1,002,859  9/1965  Great Britain.

OTHER REFERENCES

The Carwin Company, Technical Bulletin, February 1962, page 1.

LEON D. ROSDOL, *Primary Examiner.*

S. D. SCHWARTZ, *Assistant Examiner.*